(12) United States Patent
Lee et al.

(10) Patent No.: US 9,202,279 B2
(45) Date of Patent: Dec. 1, 2015

(54) APPARATUS AND METHOD FOR ANALYZING ULTRASONIC IMAGE

(75) Inventors: Jong-Ha Lee, Yongin-si (KR); Moon-Ho Park, Seoul (KR); Yeong-Kyeong Seong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 840 days.

(21) Appl. No.: 13/368,213

(22) Filed: Feb. 7, 2012

(65) Prior Publication Data

US 2013/0022253 A1    Jan. 24, 2013

(30) Foreign Application Priority Data

Jul. 22, 2011   (KR) .................. 10-2011-0073201

(51) Int. Cl.
  *G06K 9/00* (2006.01)
  *G06T 7/00* (2006.01)
(52) U.S. Cl.
  CPC ..... *G06T 7/0028* (2013.01); *G06T 2207/10132* (2013.01); *G06T 2207/20056* (2013.01); *G06T 2207/30004* (2013.01)
(58) Field of Classification Search
  USPC .......................... 382/128–132, 276, 291, 294
  See application file for complete search history.

(56) References Cited

U.S. PATENT DOCUMENTS

| | | | |
|---|---|---|---|
| 6,990,229 B2 | 1/2006 | Ohishi | |
| 7,912,259 B2 * | 3/2011 | Arditi et al. | 382/128 |
| 2009/0208080 A1 * | 8/2009 | Grau et al. | 382/131 |
| 2009/0304252 A1 | 12/2009 | Hyun et al. | |

FOREIGN PATENT DOCUMENTS

| | | |
|---|---|---|
| KR | 2003-0045839 A | 6/2003 |
| KR | 10-2009-0127101 | 12/2009 |
| KR | 10-2010-0025431 A | 3/2010 |
| KR | 10-2011-0018573 A | 2/2011 |

OTHER PUBLICATIONS

Woo, J. et al., "Non-Rigid Ultrasound Image Registration Based on Intensity and Local Phase Information," May 20, 2008, pp. 33-34, Springer Science + Business Media, United States.
Lee, J. et al., "Topology Preserving Relaxation Labeling for Nonrigid Point Matching," IEEE Transactions on Pattern Analysis and Machine Intelligence, Feb. 2011, pp. 427-432, vol. 33, No. 2.

* cited by examiner

*Primary Examiner* — Wesley Tucker
(74) *Attorney, Agent, or Firm* — NSIP Law (57) ABSTRACT

An apparatus for analyzing an ultrasonic image is provided. The apparatus includes a feature point extracting unit configured to convert the ultrasonic image into a phase information image and extract a feature point from the phase information image, and an image registering unit configured to perform an image registration on the ultrasonic image based on the extracted feature point.

17 Claims, 8 Drawing Sheets

APPARATUS AND METHOD FOR ANALYZING ULTRASONIC IMAGE

CROSS-REFERENCE TO RELATED APPLICATION(S)

This application claims the benefit under 35 U.S.C. §119(a) of Korean Patent Application No. 10-2011-0073201, filed on Jul. 22, 2011, in the Korean Intellectual Property Office, the entire disclosure of which is incorporated herein by reference for all purposes.

BACKGROUND

1. Field

The following description relates to an apparatus and a method for analyzing an ultrasonic image.

2. Description of the Related Art

Image registration is an image processing technique for displaying two or more images of the same object on one coordinate system. The images may originally be in different coordinate systems, acquired at different times, obtained from different points of view, or any combination thereof.

In the medical field, x-rays may be used to acquire an image of the inside a human body. As another aspect, usage of ultrasound may be more effective for imaging a fetus and some organs, such as the liver, the intestines, and the spleen, since they have non-rigid body characteristics.

By registering ultrasonic images acquired by the usage of ultrasound, comparing a change in a lesion having a non-rigid body characteristic over time or a comparison to tissues of patients with normal tissue is possible. As another aspect, the quality of an ultrasonic image tends to be degraded by noise and the image may have poor brightness and reduced contrast, and thus accurately registering two or more ultrasonic images acquired at different points in time may be difficult.

SUMMARY

According to an aspect, an apparatus for analyzing an ultrasonic image is provided. The apparatus includes a feature point extracting unit configured to convert the ultrasonic image into a phase information image and extract a feature point from the phase information image, and an image registering unit configured to perform an image registration on the ultrasonic image based on the extracted feature point.

The feature point extracting unit may detect a boundary of a target object within the phase information image and extract a plurality of feature points from the detected boundary of the target object.

The feature point extracting unit may include a converting unit configured to convert the ultrasonic image into the phase information image, a boundary extracting unit configured to obtain boundary pixels corresponding to a boundary of a target object within the phase information image, and a sampling unit configured to extract the feature point by sampling the obtained boundary pixels.

The boundary extracting unit may convert the phase information image into a binary image and then obtain the boundary pixels.

The boundary extracting unit may smooth edges of the target object by applying a morphological filter to the binary image and then obtain the boundary pixels.

The image registering unit may define a difference between first histogram information and second histogram information, the first histogram information being related to feature points of a first ultrasonic image acquired at time t and the second histogram information is related to feature points of a second ultrasonic image acquired at time t+1, and interpolate the feature points of the first ultrasonic image and the feature points of the second ultrasonic image such that the difference is minimized.

The image registration may be performed with the ultrasonic image and a different ultrasonic image.

An object may be detected in the ultrasonic image based on the image registration.

The image registration may be performed based on histogram information of the feature point.

In another aspect, an apparatus for analyzing an ultrasonic image is provided. The apparatus includes a feature point extracting unit configured to convert the ultrasonic image into a speckle-noise reduced image, and extract a feature point from the speckle-noise reduced image, and an image registering unit configured to perform image registration on the ultrasonic image based on the extracted feature point.

The feature point extracting unit may detect a boundary of a target object within the speckle-noise reduced image and extract a plurality of feature points from the detected boundary of the target object.

The feature point extracting unit may include a converting unit configured to convert the ultrasonic image into the speckle-noise reduced image, a boundary extracting unit configured to obtain boundary pixels corresponding to the boundary of the target object within the speckle-noise reduced image, and a sampling unit configured to extract the feature points by sampling the obtained boundary pixels.

The boundary extracting unit may obtain the boundary pixels after converting the speckle-noise reduced image into a binary image.

The boundary extracting unit may smooth edges of the target object by applying a morphological filter to the binary image and then obtain the boundary pixels.

The image registering unit may define a difference between first histogram information and second histogram information, the first histogram information being related to feature points of a first ultrasonic image acquired at time t and the second histogram information is related to feature points of a second ultrasonic image acquired at time t+1, and interpolate the feature points of the first ultrasonic image and the feature points of the second ultrasonic image such that the difference is minimized.

In another aspect, an apparatus for analyzing an ultrasonic image is provided. The apparatus includes a processor configured to extract first feature points from a first phase information image, which corresponds to a first ultrasonic image, and second feature points from a second phase information image, the second phase information image corresponding to a second ultrasonic image that is different from the first ultrasonic image, and register the first and the second ultrasonic images using the extracted first and second feature points.

The processor may detect a boundary of a target object within each of the first phase information image and the second phase information, and extract a plurality of feature points from the extracted boundary of the target object.

In another aspect, a method of analyzing an ultrasonic image is provided. The method includes converting the ultrasonic image into a phase information image and extracting a feature point from the phase information image, and performing an image registration on the ultrasonic image based on the extracted feature point.

In another aspect, a method of analyzing an ultrasonic image is provided. The method includes converting the ultrasonic image into a speckle-noise reduced image and extracting a feature point from the speckle-noise reduced image, and performing an image registration on the ultrasonic image based on the extracted feature point.

In another aspect, an ultrasound for analyzing an ultrasonic image is provided. The ultrasound includes an apparatus including a feature point extracting unit configured to extract a feature point from the ultrasonic image, and an image registering unit configured to perform an image registration on the ultrasonic image based on the extracted feature point. Other features and aspects may be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Figure 1:
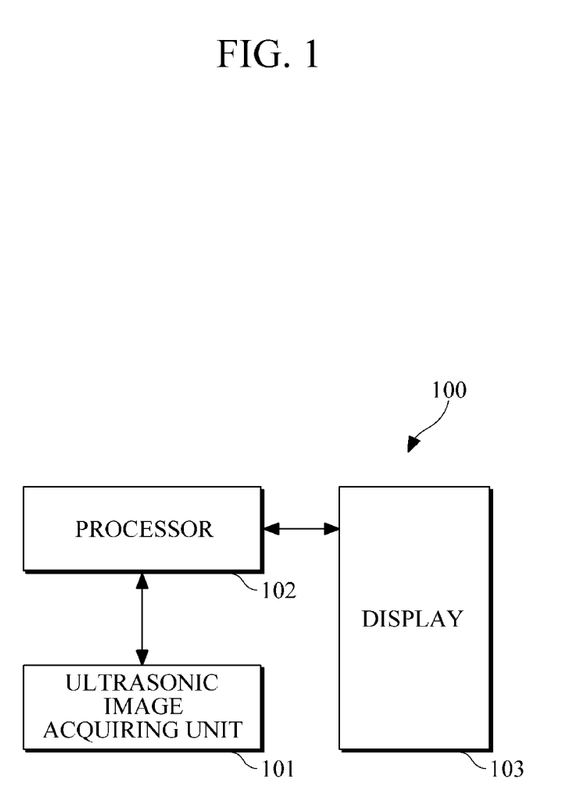
FIG. 1 is a diagram illustrating an example of an apparatus for analyzing an ultrasonic image.

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness. FIG. 1 illustrates an example of an apparatus for analyzing an ultrasonic image.

Referring to FIG. 1, an apparatus 100 may be used in an ultrasonic image diagnostic apparatus. For example, the apparatus 100 may radiate an ultrasonic wave to a particular portion of a human body, generate an image according to a waveform of the reflected ultrasonic wave, and detect a specific object or target inside the human body based on the generated image. In this example, the specific object or target may be a lesion, but the specific object or target is not limited thereto. In another example, the specific object or target to be examined or observed may be a fetus, or an object or target other than a lesion may be examined or observed. Furthermore, the apparatus 100 may be used for animals or other objects or targets to be examined or observed.

The apparatus 100 may also include an ultrasonic image acquiring unit 101, a processor 102, and a display 103.

The ultrasonic image acquiring unit 101 may radiate an ultrasonic wave to a particular portion of a human body, and analyze a waveform of an ultrasonic wave reflected by the human body to acquire an ultrasonic image.

The processor 102 may match two or more ultrasonic images acquired at different points in time, and detect a lesion based on an analysis of the matched ultrasonic images. For example, the processor 102 may convert a first ultrasonic image acquired at time t into a first phase information image, and extract first feature points from the first phase information image. Also, the processor 102 may convert a second ultrasonic image acquired at time t+/into a second phase information image and extract second feature points from the second phase information image. The conversion of the second ultrasonic image may occur at a different time as the conversion of the first ultrasonic image. Furthermore, the processor 102 may match the extracted first feature points and the extracted second feature points, to thereby register the first ultrasonic image and the second ultrasonic image.

As an example, a phase information image may be phase information of an ultrasonic image acquired by fast Fourier transform (FFT). For example, an FFT phase value of each pixel of an original ultrasonic image may be mapped onto each pixel of the phase information image. In addition, a feature point may be a sampling result of corresponding pixels on an edge of an object in the phase information image.

The display 103 may display to a user the registered first and second ultrasonic images.

Figure 2:
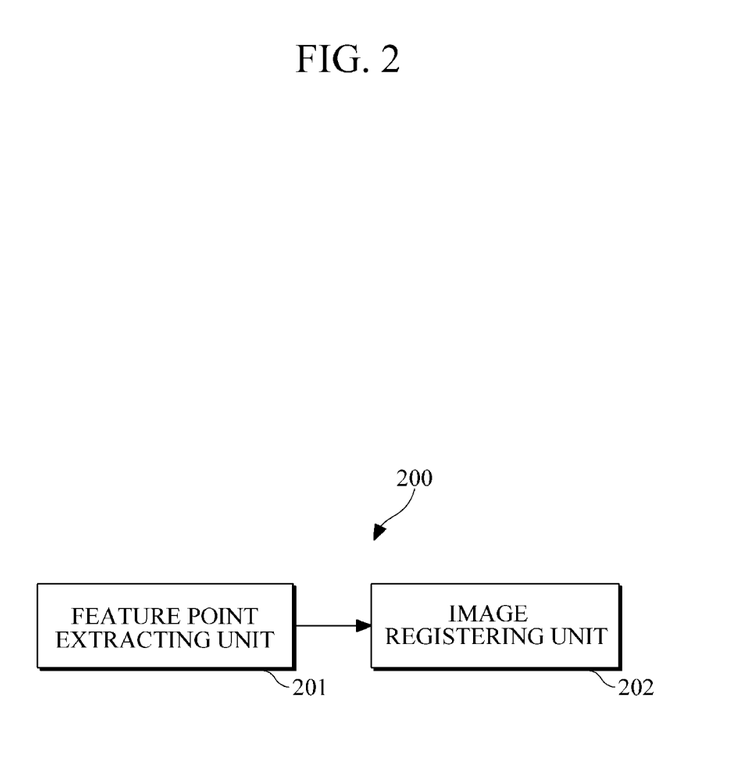
FIG. 2 is a diagram illustrating another example of an apparatus for analyzing an ultrasonic image.

FIG. 2 illustrates another example of an apparatus for analyzing an ultrasonic image.

Referring to FIG. 2, an apparatus 200 for analyzing an ultrasonic image may be a part of the processor 102 illustrated in FIG. 1. For example, the apparatus 200 may be implemented as a hardware block or a software block of the processor 102.

In FIG. 2, the apparatus 200 may include a feature point extracting unit 201 and an image registering unit 202.

The feature point extracting unit 201 may convert an ultrasonic image into a phase information image. As an example, the feature point extracting unit 201 may perform a FFT on an acquired ultrasonic image to extract phase information from the ultrasonic image, and generate a phase information image based on the extracted phase information. For example, in response to the intensity of a signal or an amplitude of a signal being mapped to each pixel of the ultrasonic image, a phase of the signal may be mapped to each pixel of the phase information image. FFT may convert the intensity or the amplitude of a signal into frequency or phase information.

In another example, the feature point extracting unit 201 may convert the ultrasonic image into a speckle-noise reduced image. The speckle-noise reduced image may be an image resulting from applying a speckle noise reduction filter to the ultrasonic image and then performing image segmentation on the resultant image. Examples of speckle noise reduction methods may include a noise enhanced squeeze box filter (NESBF), speckle reducing anisotropic diffusion (SRAD), wavelet Bayes shrinkage, and the like. The NESPF may substitute feature points with an average of peripheral pixels other than some peripheral pixels which are significantly different from the feature points. Thus, the current pixels are preserved while is reducing noise. SRAD may use a diffusion filter to detect a boundary of an object within an image and perform smoothing on areas other than the detected border. Thus, SRAD may preserve the border and achieve a smoothing effect. WBS may reduce unnecessary parts of horizontal, vertical and diagonal elements, which are obtained by discrete wavelet transform (DWT), and perform an inverse transform on a wavelet coefficient that satisfies a predetermined criterion to reduce speckle noise.

In addition, the feature point extracting unit 201 may extract at least one feature point from the converted phase information image (or the speckle-noise reduced image). In one example, the feature point extracting unit 201 may detect a boundary of a target object within the phase information image, and extract at least one pixel corresponding to the detected boundary as at least one feature point. For example, the feature point extracting unit 201 may compare a phase value of each pixel with a predetermined threshold value, and determine whether or not the pixel corresponds to the boundary of the object based on results of the comparison.

The image registering unit 202 may use the at least one detected feature point to perform image registration. In one example, the image registering unit 202 may define a difference between first histogram information and second histogram information where the first histogram information is related to at least one feature point of the first ultrasonic image acquired at time t and the second histogram information is related to at least one feature point of the second ultrasonic image acquired at time t+1. The difference may be, for example, an objective function or a cost function. Also, the image registering unit 202 may perform interpolation on the at least one feature point of the first ultrasonic image and the at least one feature point of the second ultrasonic image so as to minimize the differences between the first histogram information and the second histogram information.

In another example, the feature point extracting unit 201 may convert the phase information image into a binary image, detect a boundary of a target object within the resultant binary image, and extract some of the pixels corresponding to the detected border as feature points.

In another example, the feature point extracting unit 201 may convert the phase information image into a binary image and apply a morphological filter to the converted binary image. As a result of applying the morphological filter, smoothing edges of a target object may occur, and thereafter some of the pixels corresponding to the smoothed edges of the target object may be extracted as feature points.

In another example, the image registering unit 202 may register ultrasonic images based on iterated closest point (ICP), thin plate spline robust point matching (TPS-RPM), coherent point drift (CPD), shape context (SC), kernel correlation (KC), and the like.

Figure 3:
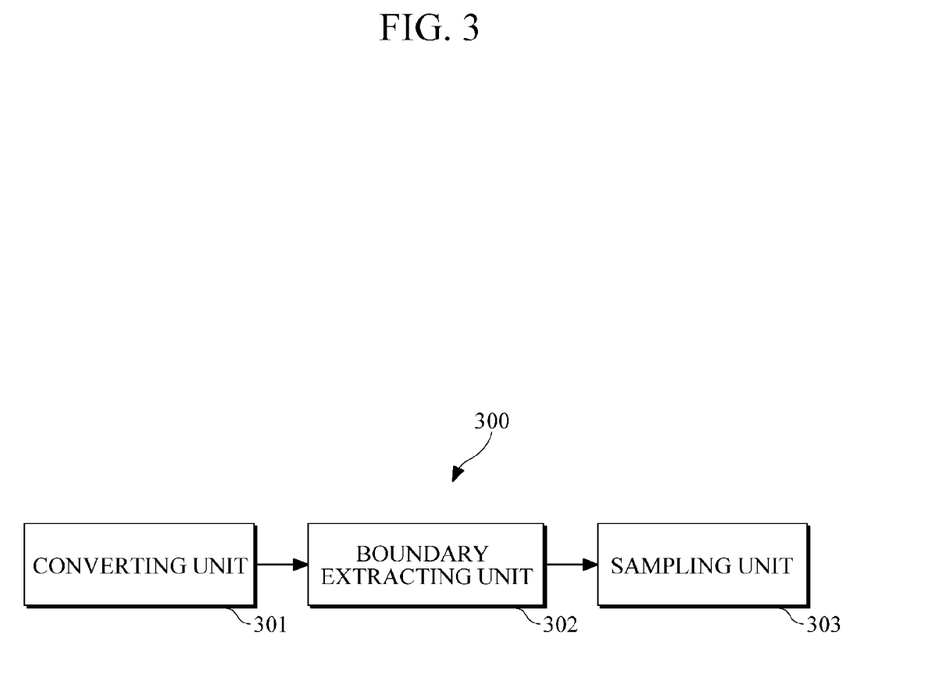
FIG. 3 is a diagram illustrating an example of a feature point extracting unit.

FIG. 3 illustrates an example of a feature point extracting unit.

Referring to FIG. 3, feature point extracting unit 300 may include a converting unit 301, a boundary extracting unit 302, and a sampling unit 303.

The converting unit 301 may convert a received ultrasonic image into a phase information image. As an example, the converting unit 301 may apply a FFT filter on an ultrasonic image having pixels to generate a phase information image. The phase information image has a number of pixels, onto each of which a phase of a signal is mapped onto each of which the amplitude of the signal is mapped.

The boundary extracting unit 302 may detect a boundary of a target object within the phase information image. In one example, the boundary extracting unit 302 may detect pixels whose phase information changes significantly. For example, a phase value of each pixel is compared with a predetermined threshold value, and the boundary extracting unit 302 may determine whether or not the pixel corresponds to a boundary of the target object based on a result of the comparison.

The sampling unit 303 may extract a feature point by sampling some pixels corresponding to the boundary extracted by the boundary extracting unit 302. In other words, the boundary extracting unit 302 may extract a given line, and further extract a plurality of points from the extracted line.

Figure 4:
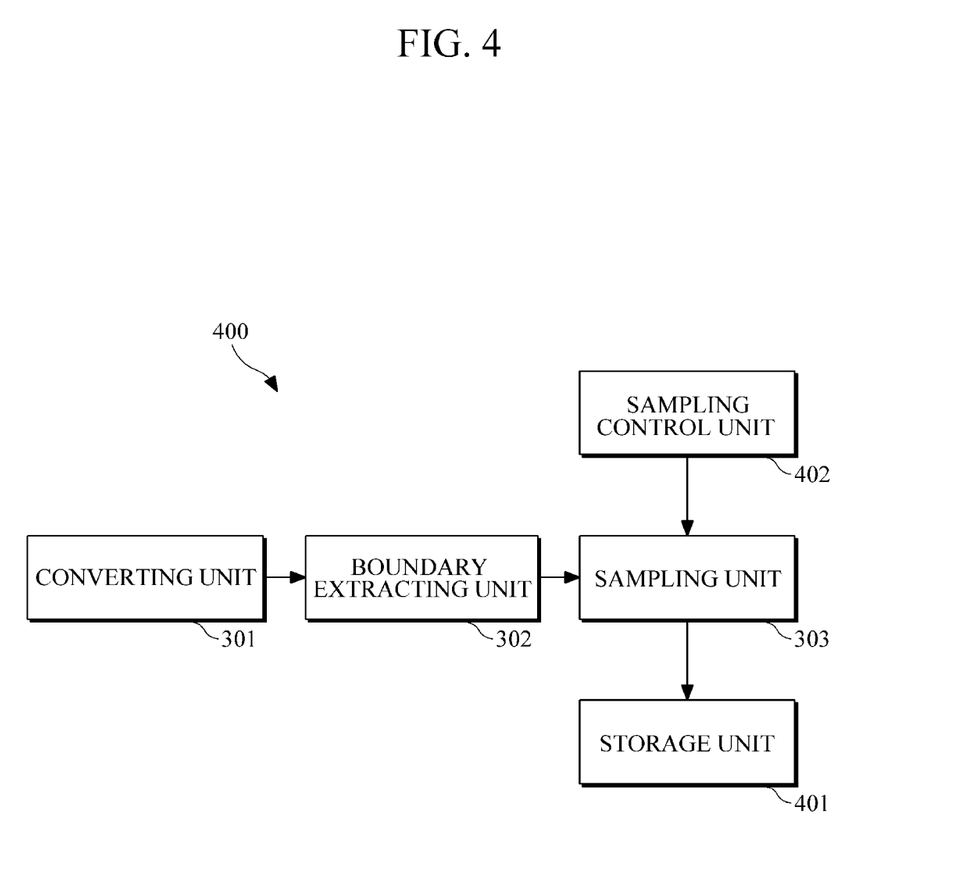
FIG. 4 is a diagram illustrating another example of a feature point extracting unit.

FIG. 4 illustrates another example of a feature point extracting unit.

Referring to FIG. 4, the feature point extracting unit 400 may include a converting unit 301, a boundary extracting unit 302, a sampling unit 303, a storage unit 401, and a sampling control unit 402. The configurations and operations of the converting unit 301, the boundary extracting unit 302, and the sampling unit 303, which have the same reference numerals as the corresponding units of FIG. 3, are substantially similar to those units in FIG. 3, and thus the detailed description thereof will not be reiterated for conciseness.

The storage unit 401 may store a sampling result from the sampling unit 303. As an example, the storage unit 401 may store feature points for an image frame. For example, the storage unit 401 may individually store feature points of a first ultrasonic image (or a first phase information image) at time t and feature points of a second ultrasonic image (or a second information image) at time t+1.

The sampling control unit 402 may set a sampling interval, sampling speed, the number of feature points to be generated by the sampling unit 303, or any combination thereof. For example, in response to the boundary extracting unit extracting a boundary of a target object, the sampling control unit 402 may determine whether feature points are extracted by dividing the extracted boundary at regular intervals or at irregular intervals, or determine the number of all feature points. A user may specify setting values of the sampling control unit 402.

In another example, the setting values of the sampling control unit 402 may be changed according to properties of a target object or applications. For example, the sampling control unit 402 may set the sampling speed to be lower than a default value in the case of a rigid body target object that is more rigid than a typical body target object, and set the sampling speed to be greater than a default value in the case of a non-rigid body target object that is less rigid than a typical body target object.

Figure 5:
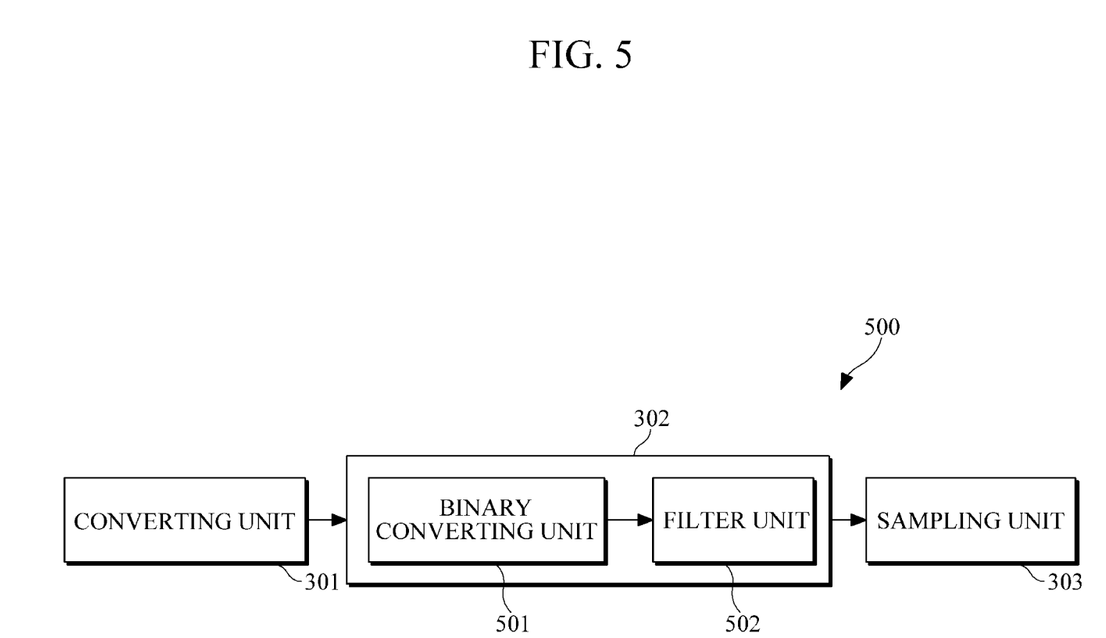
FIG. 5 is a diagram illustrating yet another example of a feature point extracting unit.

FIG. 5 illustrates yet another example of a feature point extracting unit.

Referring to FIG. 5, feature point extracting unit 500 may include a converting unit 301, a boundary extracting unit 302, and a sampling unit 303. The boundary extracting unit 302 may include a binary converting unit 501 and a filter unit 502. The converting unit 301, the boundary extracting unit 302, and the sampling unit 303, which have the same reference numerals as those in FIG. 3, are substantially the same as the corresponding units in FIG. 3, and thus the detailed descriptions thereof will not be reiterated for conciseness.

In one example, the boundary extracting unit 302 may convert a phase information image obtained from the converting unit 301 into a binary image, and detect a boundary of a target object within the converted boundary image. For example, the binary converting unit 501 may compare each pixel value (that is, a phase value) of the phase information image with a predetermined threshold value, and map the pixel value to 1 or 0 according to the comparison result to generate the binary image.

In another example, the boundary extracting unit 302 may convert the phase information image obtained from the converting unit 301 into a binary image, apply a morphological filter to smooth edges of a target object within the binary image, and then extract the boundary of the target object. For example, the binary image acquired by the binary converting unit 501 may be input to the filter unit 502, and then the filter unit 502 may apply a morphological filter to the resultant binary image. Thus, the morphological filter may smooth edges of a target object within the binary image, and then a boundary of the target object may be detected. For example, the binary image generated by the binary converting unit 501 may be input to the filter unit 502, and the filter unit 502 may apply a morphological filter to the binary image. Examples of a morphological filter for smoothing edges of an object within an image may include a median filter, a Gaussian filter, and the like.

In FIG. 5, the example illustrates that both the binary converting unit 501 and the filter unit 502 may be used. As another aspect, it should be appreciated that the binary converting unit 501 or the filter unit 502 may be used solely for applications.

Figure 6:
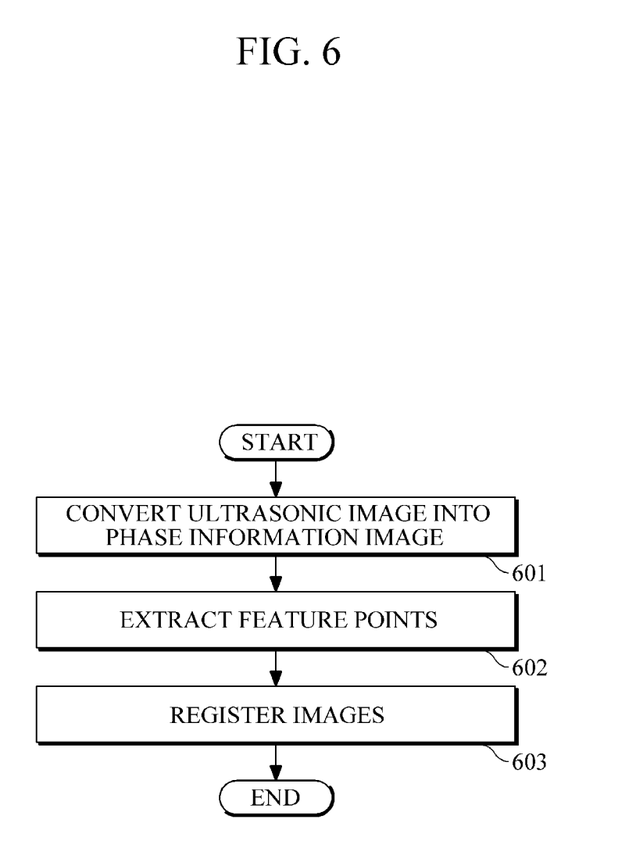
FIG. 6 is a flowchart illustrating an example of a method for analyzing an ultrasonic image.
Figure 7:
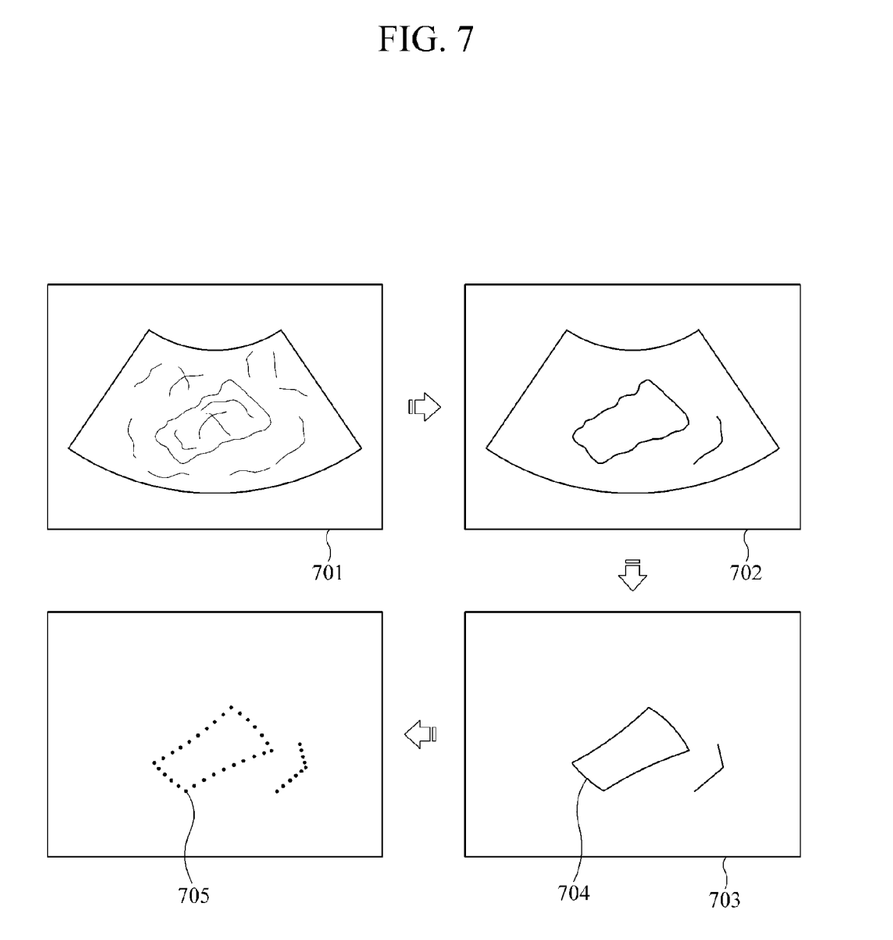
FIG. 7 is a diagram illustrating examples of ultrasonic images.
Figure 8:
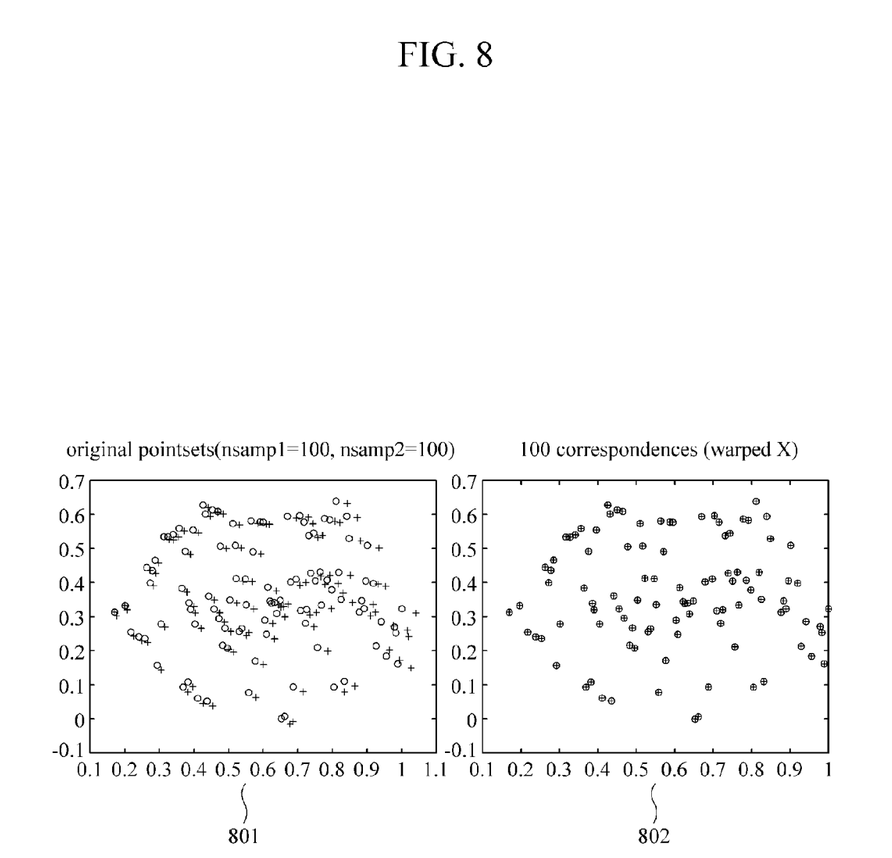
FIG. 8 is a diagram illustrating examples of feature point matching.

FIG. 6 illustrates an example of a method for analyzing an ultrasonic image. FIG. 7 illustrates examples of ultrasonic images. FIG. 8 illustrates examples of feature point matching.

With reference to FIGS. 2, and 6 to 8, the method for analyzing an ultrasonic image is described hereinafter.

The apparatus 200 for analyzing an ultrasonic image converts an acquired ultrasonic image into a phase information image or a speckle-noise reduced image in operation 601. For example, as shown in FIG. 7, the apparatus 200 may convert an ultrasonic image 701 into a phase information image 702. Since the phase information image 702 may have consistent characteristics regardless of noise, brightness, and contrast, the phase information image 702 may be efficient to detect a target object (e.g., a lesion) within the ultrasonic image 701 containing speckle noise. In other words, the phase information image may correspond to a speckle-noise reduced image.

Then, the apparatus 200 may extract at least one feature point from the phase information image in operation 602. For example, as shown in FIG. 7, the apparatus 200 may generate a boundary image 703 by extracting boundaries of a target object within the phase information image 702, and may extract at least one feature point 705 by sampling pixels corresponding to edges 704 of the target object. In FIG. 7, the boundary image 703 may be obtained by converting the phase information image 702 into a binary image and then applying a morphological filter to the resultant binary image. A method of obtaining the binary image is not, however, limited thereto, and the phase information image 702 itself may be used as the boundary image 703.

The apparatus 200 registers the ultrasonic images using the extracted at least one feature point in operation 603. For example, as shown in FIG. 8, the apparatus 200 may register image frames by matching at least one feature point acquired from a first image frame and at least one feature point acquired from a second image frame as shown in FIG. 8. In FIG. 8, original pointsets 801 may represent feature points before matching and correspondences 802 may represent feature points after matching. For example, in FIG. 8, "o" may represent a feature point of a first image frame and "x" may represent a feature point of a second image frame.

As illustrated in the above examples, feature points may be extracted based on phase information that is robust against speckle noise, and ultrasonic images may be registered based on the extracted feature points, so that a lesion included in image frames may be easily detected.

Furthermore, feature points may be extracted from a boundary of a target object, and thus images may be accurately registered for a non-rigid body target object, as well as a rigid body target object.

Examples of an ultrasonic image diagnostic apparatus includes an ultrasound.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable recording mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running. A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for analyzing an ultrasonic image, the apparatus comprising:
   a processor comprising:
   a feature point extracting unit configured to
      convert the ultrasonic image into a phase information image, and convert the phase information image into a binary image, and
      extract a feature point from the binary image; and
   an image registering unit configured to perform an image registration on the ultrasonic image based on the extracted feature point.

2. The apparatus of claim 1, wherein the feature point extracting unit is further configured to:
   detect a boundary of a target object within the binary image; and
   extract feature points from the detected boundary of the target object.

3. The apparatus of claim 1, wherein the feature point extracting unit further comprises:
   a converting unit configured to convert the ultrasonic image into the phase information image;
   a boundary extracting unit configured to obtain boundary pixels corresponding to a boundary of a target object within the binary image; and
   a sampling unit configured to extract the feature point by sampling the obtained boundary pixels.

4. The apparatus of claim 3, wherein the boundary extracting unit is further configured to:

smooth edges of the target object, by applying a morphological filter to the binary image, and then obtaining the boundary pixels.

5. The apparatus of claim 1, wherein the image registering unit is configured to:
define a difference between first histogram information and second histogram information, wherein the first histogram information is related to feature points of a first ultrasonic image acquired at time t, and the second histogram information is related to feature points of a second ultrasonic image acquired at time t+1; and
interpolate the feature points of the first ultrasonic image and the feature points of the second ultrasonic image such that the difference is minimized.

6. An apparatus for analyzing an ultrasonic image, the apparatus comprising:
a processor comprising:
a feature point extracting unit configured to
convert the ultrasonic image into a speckle-noise reduced image, and
convert the speckle-noise reduced image into a binary image, and
extract a feature point from the binary image; and
an image registering unit configured to perform image registration on the ultrasonic image based on the extracted feature point.

7. The apparatus of claim 6, wherein the feature point extracting unit is further configured to:
detect a boundary of a target object within the binary image; and
extract feature points from the detected boundary of the target object.

8. The apparatus of claim 6, wherein the feature point extracting unit comprises:
a converting unit configured to convert the ultrasonic image into the speckle-noise reduced image;
a boundary extracting unit configured to obtain boundary pixels corresponding to the boundary of the target object within the speckle-noise reduced image; and
a sampling unit configured to extract the feature points by sampling the obtained boundary pixels.

9. The apparatus of claim 8, wherein the boundary extracting unit is further configured to:
obtain the boundary pixels after converting the speckle-noise reduced image into a binary image.

10. The apparatus of claim 9, wherein the boundary extracting unit is further configured to:
smooth edges of the target object, by applying a morphological filter to the binary image, and then obtaining the boundary pixels.

11. The apparatus of claim 6, wherein the image registering unit is further configured to:
define a difference between first histogram information and second histogram information, wherein the first histogram information is related to feature points of a first ultrasonic image acquired at time t, and the second histogram information is related to feature points of a second ultrasonic image acquired at time t+1; and
interpolate the feature points of the first ultrasonic image and the feature points of the second ultrasonic image such that the difference is minimized.

12. An apparatus for analyzing ultrasonic images, the apparatus comprising:
a processor, configured to:
extract first feature points, from a binary image converted from a first phase information image, the first phase information image corresponding to a first ultrasonic image,
extract second feature points, from a binary image converted from a second phase information image, the second phase information image corresponding to a second ultrasonic image that is different from the first ultrasonic image, and
register the first and the second ultrasonic images, by using the extracted first and second feature points.

13. The apparatus of claim 12, wherein the processor is further configured to:
detect a boundary of a target object within each of the binary image converted from the first phase information image, and the binary image converted from the second phase information; and
extract feature points from the extracted boundary of the target object.

14. A computer-implemented method of analyzing an ultrasonic image, the computer-implemented method comprising:
converting the ultrasonic image into a phase information image, and convert the phase information image into a binary image;
extracting a feature point from the binary image; and
performing an image registration on the ultrasonic image based on the extracted feature point.

15. A computer-implemented method of analyzing an ultrasonic image, the computer-implemented method comprising:
converting the ultrasonic image into a speckle-noise reduced image, and convert the speckle-noise reduced image into a binary image;
extracting a feature point from the binary image; and
performing an image registration on the ultrasonic image based on the extracted feature point.

16. A non-transitory computer-readable storage medium storing a program to analyze an ultrasonic image, comprising instructions to cause a computer to:
convert the ultrasonic image into a phase information image, and convert the phase information image into a binary image;
extract a feature point from the binary image; and
perform an image registration on the ultrasonic image based on the extracted feature point.

17. A non-transitory computer-readable storage medium storing a program to analyze an ultrasonic image, comprising instructions to cause a computer to:
convert the ultrasonic image into a speckle-noise reduced image, and convert the speckle-noise reduced image into a binary image;
extract a feature point from the binary image; and
perform an image registration on the ultrasonic image based on the extracted feature point.

* * * * *